(12) United States Patent
Levich

(10) Patent No.: US 11,246,365 B1
(45) Date of Patent: *Feb. 15, 2022

(54) THREE DIMENSIONAL PIECE EYEWEAR APPARATUS

(71) Applicant: H2W, Chatsworth, CA (US)

(72) Inventor: David Levich, West Hills, CA (US)

(73) Assignee: H2W, Chatsworth, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/741,127

(22) Filed: Jan. 13, 2020

Related U.S. Application Data

(63) Continuation of application No. 15/476,231, filed on Mar. 31, 2017, now Pat. No. 10,568,375.

(60) Provisional application No. 62/317,238, filed on Apr. 1, 2016, provisional application No. 62/317,278, filed on Apr. 1, 2016, provisional application No. 62/317,328, filed on Apr. 1, 2016, provisional application No. 62/317,355, filed on Apr. 1, 2016, provisional application No. 62/320,887, filed on Apr. 11, 2016, provisional application No. 62/320,925, filed on Apr. 11, 2016.

(51) Int. Cl.
*A41G 7/00* (2006.01)
*G02C 11/02* (2006.01)

(52) U.S. Cl.
CPC ............... *A41G 7/00* (2013.01); *G02C 11/02* (2013.01)

(58) Field of Classification Search
CPC ......... G02C 11/02; G02C 11/00; A41D 13/11; A41D 13/1184; G09F 21/02; G09F 23/00
See application file for complete search history.

(56) References Cited

U.S. PATENT DOCUMENTS

| 2,677,133 A | 5/1954 | Hoffman, Jr. |
| 2,748,528 A | 6/1956 | Bern |
| 2,832,593 A | 4/1958 | Anderson |
| D188,007 S | 5/1960 | Pacelli |
| 3,009,163 A | 11/1961 | Beauvais |

(Continued)

FOREIGN PATENT DOCUMENTS

JP 2000180801 A 6/2000

OTHER PUBLICATIONS

U.S. Appl. No. 15/476,231, filed Mar. 31, 2017, Three Dimensional Piece Eyewear Apparatus.

(Continued)

*Primary Examiner* — Robert H Muromoto, Jr.
(74) *Attorney, Agent, or Firm* — Schwegman Lundberg & Woessner, P.A.

(57) ABSTRACT

An eyewear apparatus is configured to be fitted around a face of a user such that a first earpiece is supported by a first ear of the user, a second earpiece is supported by a second ear of the user, and a bridge portion of the frame is supported by a nose of the user. When the eyewear apparatus is fitted around the face of the user, a first eyepiece is aligned with a first eye of the user to allow the user to see through a first lens disposed within an aperture of the first eyepiece. An additional structure is coupled to the frame and covers a portion of a forehead of the user when the eyewear apparatus is fitted around the face of the user. The additional structure depicts a portion a character. A three-dimensional piece affixed to the additional structure provides additional depth to the character.

20 Claims, 11 Drawing Sheets

(56) References Cited

U.S. PATENT DOCUMENTS

| | | | |
|---|---|---|---|
| D232,379 S | 8/1974 | Arner | |
| 3,991,753 A | 11/1976 | Viesca | |
| 4,121,304 A | 10/1978 | Cooper | |
| D279,989 S | 8/1985 | Mcnaughton | |
| 4,715,702 A | 12/1987 | Dillon | |
| 4,798,455 A | 1/1989 | Yoe et al. | |
| 4,944,039 A * | 7/1990 | Dietrich | A61F 9/029 292/13 |
| 5,521,655 A | 5/1996 | Rhoad | |
| D384,683 S | 10/1997 | Martinant De | |
| 5,764,338 A * | 6/1998 | Mack | G02C 11/02 351/158 |
| 5,775,018 A * | 7/1998 | Steinhorn | G02C 11/02 40/299.01 |
| D416,036 S | 11/1999 | Wang | |
| D434,432 S | 11/2000 | Wang | |
| D437,638 S | 2/2001 | Harwell, IV | |
| 6,568,804 B1 | 5/2003 | Lin | |
| 7,475,980 B2 | 1/2009 | Tanir et al. | |
| D704,253 S * | 5/2014 | Szymanowski | D16/341 |
| D729,308 S * | 5/2015 | Szymanowski | D16/342 |
| D748,184 S * | 1/2016 | Szymanowski | D16/306 |
| 10,568,375 B1 * | 2/2020 | Levich | A41G 7/00 |
| 10,754,177 B1 | 8/2020 | Levich et al. | |
| 2003/0014800 A1 | 1/2003 | Meyers | |
| 2004/0237172 A1 | 12/2004 | Quinn | |
| 2008/0117381 A1 | 5/2008 | Chen | |
| 2014/0204332 A1* | 7/2014 | Moore | G02C 11/02 351/52 |
| 2017/0356097 A1 | 12/2017 | Eagerton | |

OTHER PUBLICATIONS

U.S. Appl. No. 15/661,382, filed Jul. 27, 2017, Eyewear Apparatus Having a Partially Plated Lens (as amended).

U.S. Appl. No. 14/831,797, filed Aug. 20, 2015, Transformative Eyewear Apparatus.

"U.S. Appl. No. 14/831,797, Examiner Interview Summary dated Jun. 6, 2018", 3 pgs.

"U.S. Appl. No. 14/831,797, Examiner Interview Summary dated Jun. 27, 2017", 2 pgs.

"U.S. Appl. No. 14/831,797, Examiner Interview Summary dated Jul. 29, 2016", 2 pgs.

"U.S. Appl. No. 14/831,797, Examiner Interview Summary dated Oct. 11, 2017", 3 pgs.

"U.S. Appl. No. 14/831,797, Final Office Action dated Jun. 27, 2017", 11 pgs.

"U.S. Appl. No. 14/831,797, Final Office Action dated Jul. 19, 2019", 12 pgs.

"U.S. Appl. No. 14/831,797, Final Office Action dated Sep. 14, 2018", 8 pgs.

"U.S. Appl. No. 14/831,797, Non Final Office Action dated Feb. 15, 2019", 10 pgs.

"U.S. Appl. No. 14/831,797, Non Final Office Action dated Mar. 7, 2018", 8 pgs.

"U.S. Appl. No. 14/831,797, Non Final Office Action dated Jun. 23, 2016", 7 pgs.

"U.S. Appl. No. 14/831,797, Non Final Office Action dated Dec. 16, 2019", 11 pgs.

"U.S. Appl. No. 14/831,797, Response filed Jun. 17, 2019 to Non-Final Office Action dated Feb. 15, 2019", 8 pgs.

"U.S. Appl. No. 14/831,797, Response filed Jul. 9, 2018 to Non Final Office Action dated Mar. 7, 2018", 7 pgs.

"U.S. Appl. No. 14/831,797, Response filed Sep. 22, 2016 to Non Final Office Action dated Jun. 23, 2016", 13 pgs.

"U.S. Appl. No. 14/831,797, Response filed Oct. 21, 2019 to Final Office Action dated Jul. 19, 2019", 8 pgs.

"U.S. Appl. No. 14/831,797, Response filed Oct. 23, 2017 to Final Office Action dated Jun. 27, 2017", 8 pgs.

"U.S. Appl. No. 14/831,797, Restriction Requirement dated Dec. 15, 2016", 5 pgs.

"U.S. Appl. No. 14/831,797, Response filed Jan. 7, 2019 to Final Office Action dated Sep. 14, 18", 7 pgs.

"U.S. Appl. No. 15/476,231 , Final Office Action dated Jul. 18, 2019", 11 pgs.

"U.S. Appl. No. 15/476,231, Non Final Office Action dated Feb. 14, 2019", 10 pgs.

"U.S. Appl. No. 15/476,231, Notice of Allowability dated Nov. 6, 2019", 2 pgs.

"U.S. Appl. No. 15/476,231, Notice of Allowance dated Oct. 30, 2019", 7 pgs.

"U.S. Appl. No. 15/476,231, Response filed Jun. 14, 2019 to Non Final Office Action dated Feb. 14, 2019", 9 pgs.

"U.S. Appl. No. 15/476,231, Response filed Oct. 18, 2019 to Final Office Action dated Jul. 18, 2019", 9 pgs.

"U.S. Appl. No. 15/661,382, Examiner Interview Summary dated Apr. 16, 2019", 4 pgs.

"U.S. Appl. No. 15/661,382, Final Office Action dated Jul. 26, 2019", 19 pgs.

"U.S. Appl. No. 15/661,382, Non Final Office Action dated Nov. 4, 2019", 18 pgs.

"U.S. Appl. No. 15/661,382, Non Final Office Action dated Nov. 8, 2018", 20 pgs.

"U.S. Appl. No. 15/661,382, Response filed May 7, 2019 to Non Final Office Action dated Nov. 8, 2018", 12 pgs.

"U.S. Appl. No. 15/661,382, Response filed Oct. 18, 2019 to Final Office Action dated Jul. 26, 2019", 10 pgs.

"U.S. Appl. No. 15/665,791, Examiner Interview Summary dated Jan. 15, 2019", 5 pgs.

"U.S. Appl. No. 15/665,791, Examiner Interview Summary dated Oct. 22, 2019", 4 pgs.

"U.S. Appl. No. 15/665,791, Final Office Action dated Aug. 13, 2019", 15 pgs.

"U.S. Appl. No. 15/665,791, Non Final Office Action dated Mar. 5, 2019", 13 pgs.

"U.S. Appl. No. 15/665,791, Non Final Office Action dated Oct. 23, 2018", 16 pgs.

"U.S. Appl. No. 15/665,791, Non Final Office Action dated Nov. 7, 2019", 11 pgs.

"U.S. Appl. No. 15/665,791, Response filed Jan. 23, 2019 to Non Final Office Action dated Oct. 23, 2018", 10 pgs.

"U.S. Appl. No. 15/665,791, Response filed Jul. 3, 2019 to Non-Final Office Action dated Mar. 5, 2019", 11 pgs.

"U.S. Appl. No. 15/665,791, Response filed Oct. 16, 2019 to Final Office Action dated Aug. 13, 2019", 10 pgs.

"Electroplating", Wikipedia, [Online] Retrieved from the Internet: <URL: https://en.wikipedia.org/wiki/Electroplating>, 9 pgs.

"Webpage sunstaches.com", archived Dec. 2014 (Year: 2014), [Online]. Retrieved from the Internet: <URL: https://web.archive.org/web/20141222070740/https://sunstaches.com/>, (2014), 3 pgs.

Kulkarni, Darshan, "Protect Your Eyes with Mirror Sunglasses", Lenspick Blog, [Online] Retrieved from the Internet: <URL: https://www.lenspick.com/blog/reflect-your-style-with-mirror-sunglasses/>, (Aug. 28, 2015), 3 pgs.

"U.S. Appl. No. 14/831,797, Notice of Allowance dated Apr. 8, 2020", 8 pgs.

"U.S. Appl. No. 14/831,797, Response filed Mar. 16, 2020 to Non Final Office Action dated Dec. 16, 2019", 8 pgs.

"U.S. Appl. No. 15/661,382, Final Office Action dated May 21, 2020", 18 pgs.

"U.S. Appl. No. 15/661,382, Non Final Office Action dated Sep. 21, 2020", 16 pgs.

"U.S. Appl. No. 15/661,382, Response filed Mar. 4, 2020 to Non Final Office Action dated Nov. 4, 2019", 10 pgs.

"U.S. Appl. No. 15/661,382, Response filed Aug. 21, 2020 to Final Office Action dated May 21, 2020", 9 pgs.

"U.S. Appl. No. 16/924,024, Non Final Office Action dated Aug. 16, 2021", 22 pgs.

\* cited by examiner

THREE DIMENSIONAL PIECE EYEWEAR APPARATUS

CROSS-REFERENCE TO RELATED APPLICATIONS

This application is a continuation of U.S. patent application Ser. No. 15/476,231, filed Mar. 31, 2017, which claims the benefit of priority of U.S. Provisional Application No. 62/317,238, filed on Apr. 1, 2016, U.S. Provisional Application No. 62/317,278, filed on Apr. 1, 2016, U.S. Provisional Application No. 62/317,328, filed on Apr. 1, 2016, U.S. Provisional Application No. 62/317,355, filed on Apr. 1, 2016, U.S. Provisional Application No. 62/320,887, filed on Apr. 11, 2016, and U.S. Provisional Application No. 62/320,925, filed on Apr. 11, 2016, all of which are incorporated herein by reference in their entirety.

BACKGROUND

Some conventional eyewear apparatuses include a frame to house tinted or clear lenses for protecting a user's eyes from the sun. In some aspects, the frame is shaped in a decorative fashion to enhance how the user looks. For example, the frame can have circular lens apertures for housing the lenses. Conventional eyewear products, however, lack an ability to provide functional additions to enable additional types of uses for eyewear.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
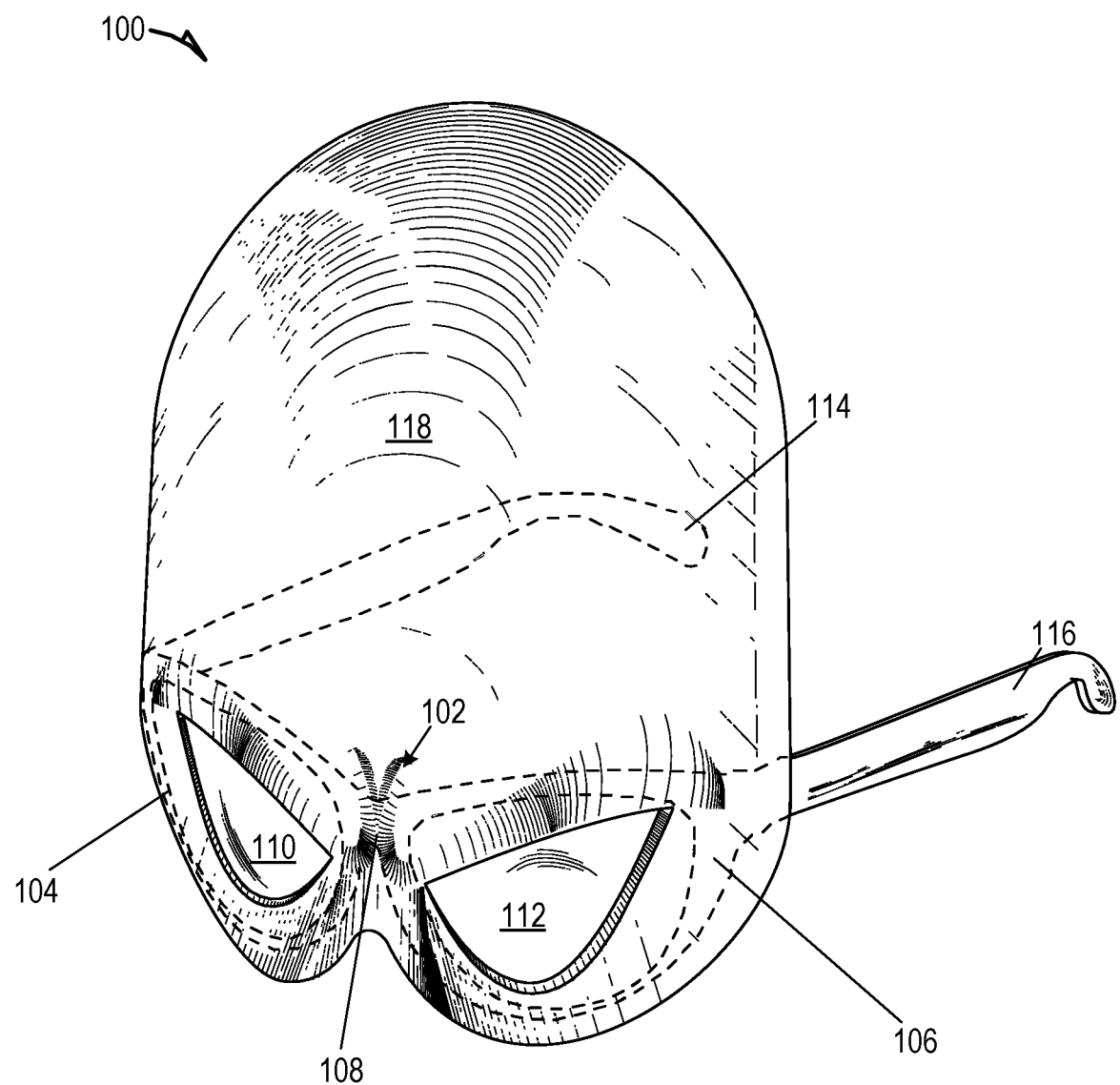
FIG. 1 shows a perspective view of an eyewear apparatus for depicting a character, according to some example embodiments.

Aspects of the subject technology address the problems of conventional eyewear implementations, which provide limited options for expanding and/or changing the functional design of an eyewear apparatus. In particular, aspects of the technology provide structural component(s) to a frame of an eyewear apparatus that alters an appearance of a user. In an example, the eyewear apparatus as described herein is shaped in a way to capture and portray a character, which allows an individual wearing the eyewear apparatus to embody the character's likeness.

In certain implementations, the subject technology provides for a structural component(s) that resembles a face (portion thereof) of a character (e.g., popular television or cartoon character). Although, the location of the structural component on the frame can vary depending on implementation, in at least one example, the structural component is located substantially on the top of the frame such that the structural component conceals the forehead of a user when the user is wearing the eyewear apparatus. In at least one embodiment, the structural component may be located at any point along the frame, however, in some embodiments, the structural component is located on the top or the sides of the frame, e.g., such that the structural component does not interfere with the user's ability to see out of the eyewear apparatus. The structural component may resemble the forehead portion, hair, eyebrows, and/or eye(s) of the character's face. The structural component may also resemble an article worn by the character, such as a mask, hat, helmet, etc. It is appreciated that the structural component may include any number of sub-components. For example, a subcomponent may resemble the character's hair, ear, eyebrow, eye, mouth, lip, or any other part of the character's face. Additionally, a sub-component, in an example, may resemble another portion of the character's anatomy such as an arm or other appendage.

In some embodiments, a three-dimensional piece is affixed to the structural component to provide additional depth to the character. For example, the three-dimensional piece may protrude outward from the structural component to depict features of the character and/or an article worn by the character, such as wings, hair, horns, etc.

In some embodiments, a portion of the structural component overlaps with a portion of a lens of the eyewear apparatus to portray a feature of the character. For example, the structural component may overlap with the lens to depict the mouth of character. In this type of embodiments, the structural component above the portion that overlaps the lens (e.g., the portion that covers the user's forehead) may depict the face of the character (e.g., depict eye, nose, etc.). The portion of the structural component that overlaps with the lens may be rounded to create the illusion that the character is smiling. A subcomponent depicting a tooth of the character may be coupled to the bottom edge of the structural component.

The eyewear apparatus can utilize various textures and materials to depict features of a character. For example, various portions of the structural component can include various textures, such as bumpy, smooth, soft, hard, etc. Additionally, various portions of the structural component can be made using different materials to provide the various textures. For example, soft and hard materials can be used to provide varying textures.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

FIG. 1 shows a perspective view of an eyewear apparatus 100 for depicting a character, according to some example embodiments. The eyewear apparatus 100 includes a frame 102 comprising a first eyepiece 104 and a second eyepiece 106 connected by a bridge portion 108 of the frame 102. The first eyepiece 104 and the second eyepiece 106 each include an aperture in which a lens can be disposed. As shown, a first lens 110 is disposed within the aperture of the first eyepiece 104, and a second lens 112 is disposed within the aperture of the second eyepiece 106. The first lens 110 and the second lens 112 can be any type of known lens used for eyewear, such as tinted lenses, prescription lenses, clear lenses, bifocal lenses, etc. Each lens 110 and 112 may be constructed of a suitable material such as glass, plastic, composites, etc., and in some embodiments may be tinted and/or include UV (ultraviolet) light protection.

The eyewear apparatus 100 further includes a first earpiece 114 coupled to the first eyepiece 104, and a second earpiece 116 coupled to the second eyepiece 106. The first earpiece 114 and the second earpiece 116 can be coupled to the first eyepiece 104 and the second eyepiece 106 using any known technique, such as by screws, glue, hinge, etc.

The eyewear apparatus 100 is configured to be fitted around a user's face such that the first earpiece 114 is supported by a first ear of the user, the second earpiece 116 is supported by a second ear of the user, and the bridge portion 108 of the frame 102 is supported by a nose of the user. When the eyewear apparatus 100 is fitted around a user's face, the first eyepiece 104 and the second eyepiece 106 are aligned with the user's eyes to allow the user to see through the first lens 110 disposed within the first eyepiece 104 and the second lens 112 disposed within the second eyepiece 106.

The eyewear apparatus 100 further includes an additional structure 118 that is coupled to the frame 102, such that the additional structure 118 covers a portion of a forehead of the user when the eyewear apparatus 100 is fitted around the face of the user. The additional structure 118 can depict a portion of a character. For example, the additional structure 118 can resemble a character's mask, face, etc., such that the first lens 110 and the second lens 112 represent the characters eyes and/or eye slots in the character's mask.

The additional structure 118 may be coupled to the frame 102 using any suitable method. For example, the additional structure 118 may be coupled to the frame 102 using screws or an adhesive material (e.g., glue) to attach the structural component 118 to the frame 102. In another embodiment, the additional structure 118 and the frame 102 may be coupled by forming the additional structure 118 and frame 102 together as a single piece included in the eyewear apparatus 100.

The additional structure 118 may depict a portion of a character, a character's mask, a helmet worn by a character, etc. A user may fit the eyewear apparatus 100 around the user's face to create the illusion that the user is wearing the character's mask and/or is the character. The additional structure 118 can be designed in any desired shape to properly depict a character, character's mask, character's helmet, etc.

Figure 2A:
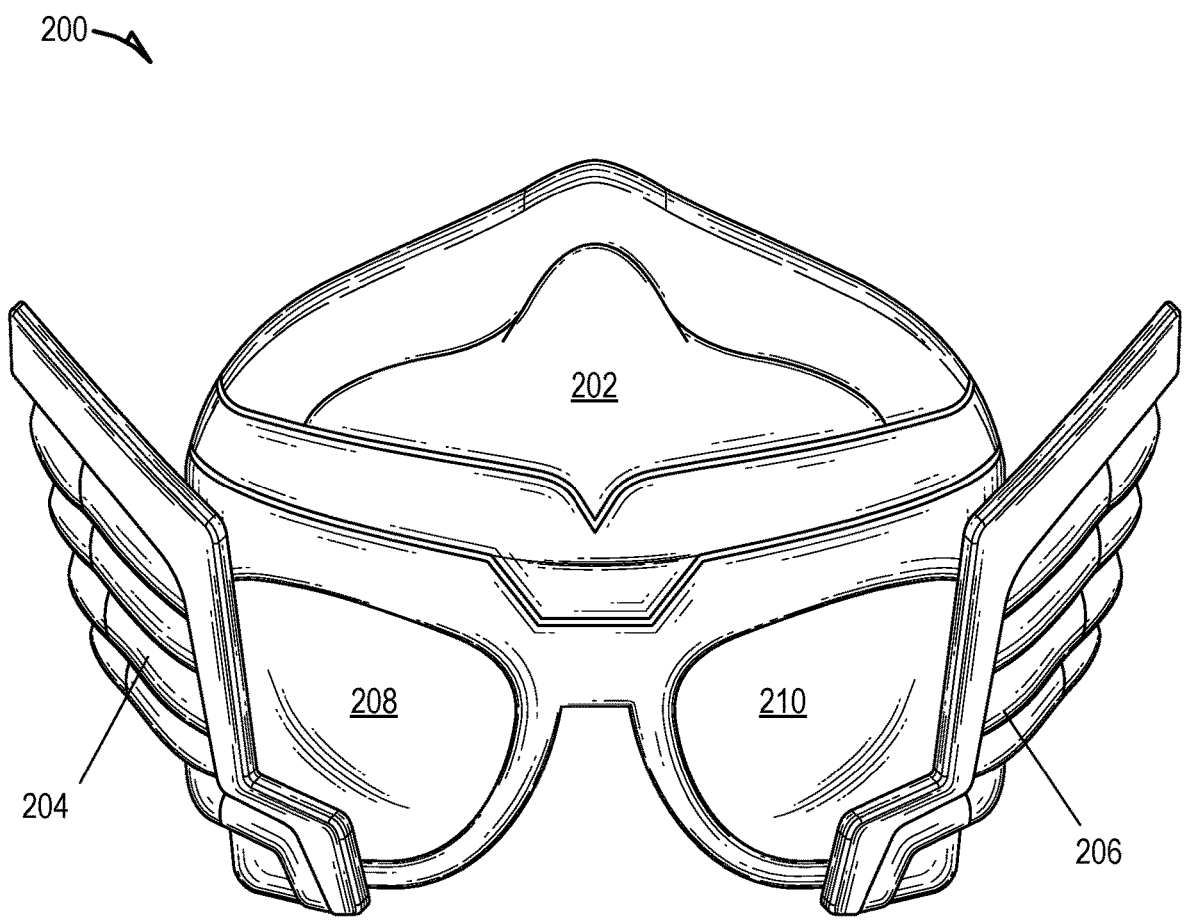
FIGS. 2A and 2B show an eyewear apparatus including a three-dimensional piece, according to some example embodiments.
Figure 2B:
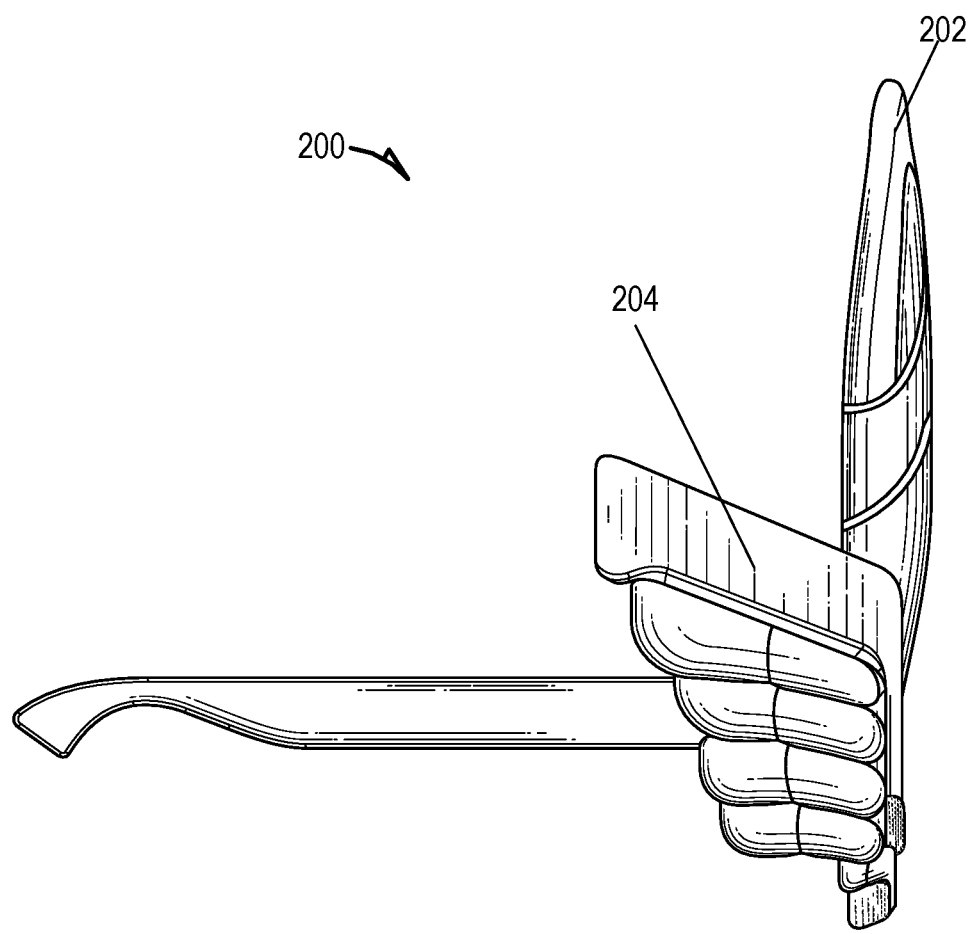

FIGS. 2A and 2B show an eyewear apparatus 200 including a three-dimensional piece, according to some example embodiments. FIG. 2A shows a front-view of the eyewear apparatus 200. As shown, the eyewear apparatus 200 includes an additional structure 202 that depicts a helmet worn by a character. The additional structure 202 covers a user's forehead when the eyewear apparatus 200 is fitted around the user's face. As a result, the eyewear apparatus 200 creates the illusion that the user is wearing the helmet and/or is the character depicted by the additional structure 202 when the eyewear apparatus 200 is fitted around the user's face.

The additional structure 202 includes a first three-dimensional piece 204 and a second three-dimensional piece 206 affixed to the front of the additional structure 202 to add additional detail and depth to the mask depicted by the eyewear apparatus 200. As show, the first three-dimensional piece 204 and the second three-dimensional piece 206 are both affixed to outside edges of the additional structure 202 and depict wings that extend outwards away from the center of the eyewear apparatus 200. Further, the first three-dimensional piece 204 overlaps a portion of a first lens 208 of the eyewear apparatus 200, and the second three-dimensional piece 206 overlaps a portion of a second lens 210 of the eyewear apparatus 200.

The first three-dimensional piece 204 and the second three-dimensional piece 206 can be affixed to the additional structure 202 using any known technique, such as by screws, nails, adhesive material (e.g., glue), hinge, etc. In some embodiments, the first three-dimensional piece 204 and the second three-dimensional piece 206 are molded from the same piece of material as the additional structure 202.

FIG. 2B shows a side-view of the eyewear apparatus 200. As shown, the first-three dimensional piece 204 is affixed to the front side of the additional structure 204 that faces outwards from the user when the eyewear apparatus 200 is fitted around the face of the user. The first three-dimensional piece 204 extends outward away from the center of the additional structure 202 as well as backwards. Accordingly, the first-three dimensional piece 204 will cover a portion of a side of the user's face when the eyewear apparatus 200 is fitted around the user's face.

Figure 3A:
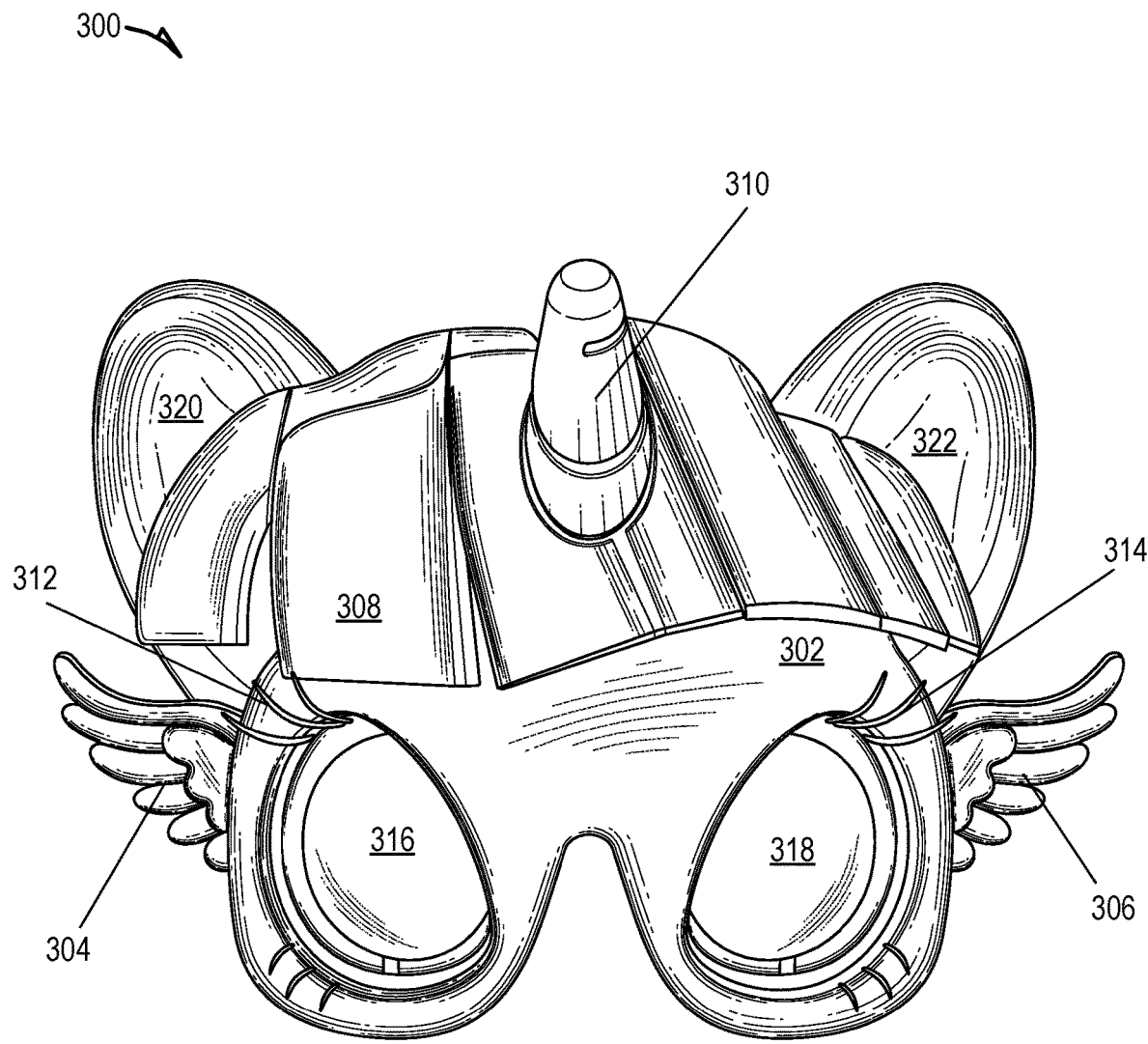
FIGS. 3A and 3B show an eyewear apparatus including a three-dimensional piece, according to some example embodiments.
Figure 3B:
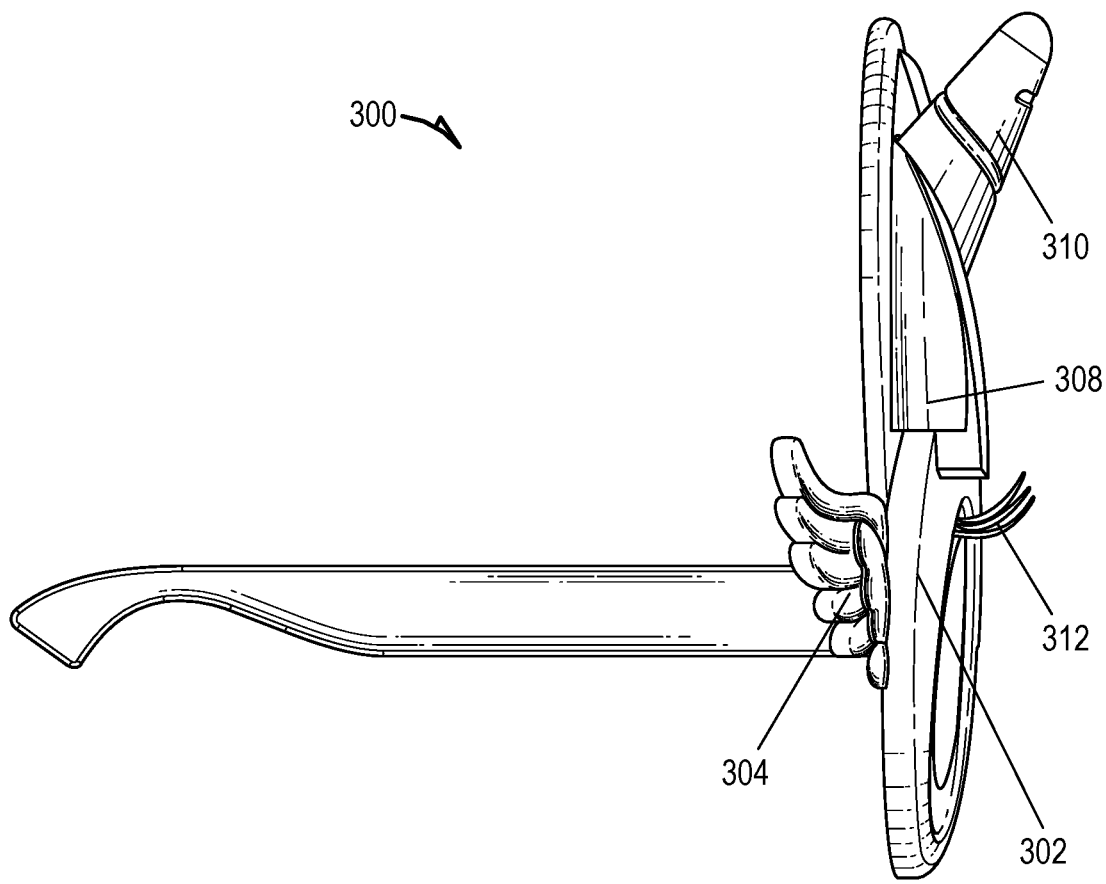

FIGS. 3A and 3B show an eyewear apparatus 300 including a three-dimensional piece, according to some example embodiments. FIG. 3A shows a front-view of the eyewear apparatus 300. As shown, the eyewear apparatus 300 includes an additional structure 302 that depicts a character. The additional structure 302 covers a user's forehead when the eyewear apparatus 300 is fitted around the user's face. As a result, the eyewear apparatus 300 creates the illusion that the user is the character depicted by the additional structure 302 when the eyewear apparatus 300 is fitted around the user's face.

The additional structure 302 includes multiple three-dimensional pieces to add additional detail and depth to the character depicted by the eyewear apparatus 300. For example, a first three-dimensional piece 304 and a second three-dimensional piece 306 are affixed to outside edges of the additional structure 302 and depict wings that extend outwards away from the center of the eyewear apparatus 300. The first three-dimensional piece 304 and the second three-dimensional piece 306 are affixed to a back side of the additional structure 302. As a result, the first three-dimensional piece 304 and the second three-dimensional piece 306 do not obscure the character depicted on the front side of the additional structure 302. Further, affixing the first three-dimensional piece 304 and the second three-dimensional piece 306 to the back side of the additional structure 302 provides additional depth to the character by creating the illusion that the wings are affixed to a different portion of the character (e.g., body), rather than the face of the character.

A third three-dimensional piece 308 is affixed to the front side of the additional structure 302 and depicts the character's hair. As shown, the third three-dimensional piece 308 is affixed over a top portion of the additional structure 302 that covers a user's forehead and/or hair when the eyewear apparatus 300 is fitted around the user's face. A fourth three-dimensional piece 310 is affixed to the front side of the additional structure 302 and protrudes outwards to depict a horn of the character. In some embodiments, the fourth three-dimensional piece 308 is molded from the same piece of material as the additional structure 302.

A fifth three-dimensional piece 312 and a sixth three-dimensional piece 314 depict eyelashes of the character. As shown, the fifth three-dimensional piece 312 and the sixth three-dimensional piece 314 are affixed to the front side of the additional structure 302 above a first lens 316 and second lens 318 of the eyewear apparatus.

The additional structure 302 includes a first subcomponent 320 and a second subcomponent 322 that are coupled to the top edge of the additional structure 302. The first subcomponent 320 and the second subcomponent 322 depict ears of the character.

FIG. 3B shows a side-view of the eyewear apparatus 300. As shown, the first-three dimensional piece 304 is affixed to the back side of the additional structure 304 that faces inwards towards the user when the eyewear apparatus 200 is fitted around the face of the user. The first three-dimensional piece 304 extends outward away from the center of the additional structure 302 as well as backwards. Accordingly, the first-three dimensional piece 304 will cover a portion of a side of the user's face when the eyewear apparatus 300 is fitted around the user's face.

As shown, the third three-dimensional piece 308, the four three-dimensional piece 310 and the fifth three-dimensional piece 312, are all attached to the front side of the additional structure and extend outwards away from the additional structure 302 to add additional detail and depth to the character depicted by the eyewear apparatus 300.

Figure 4:
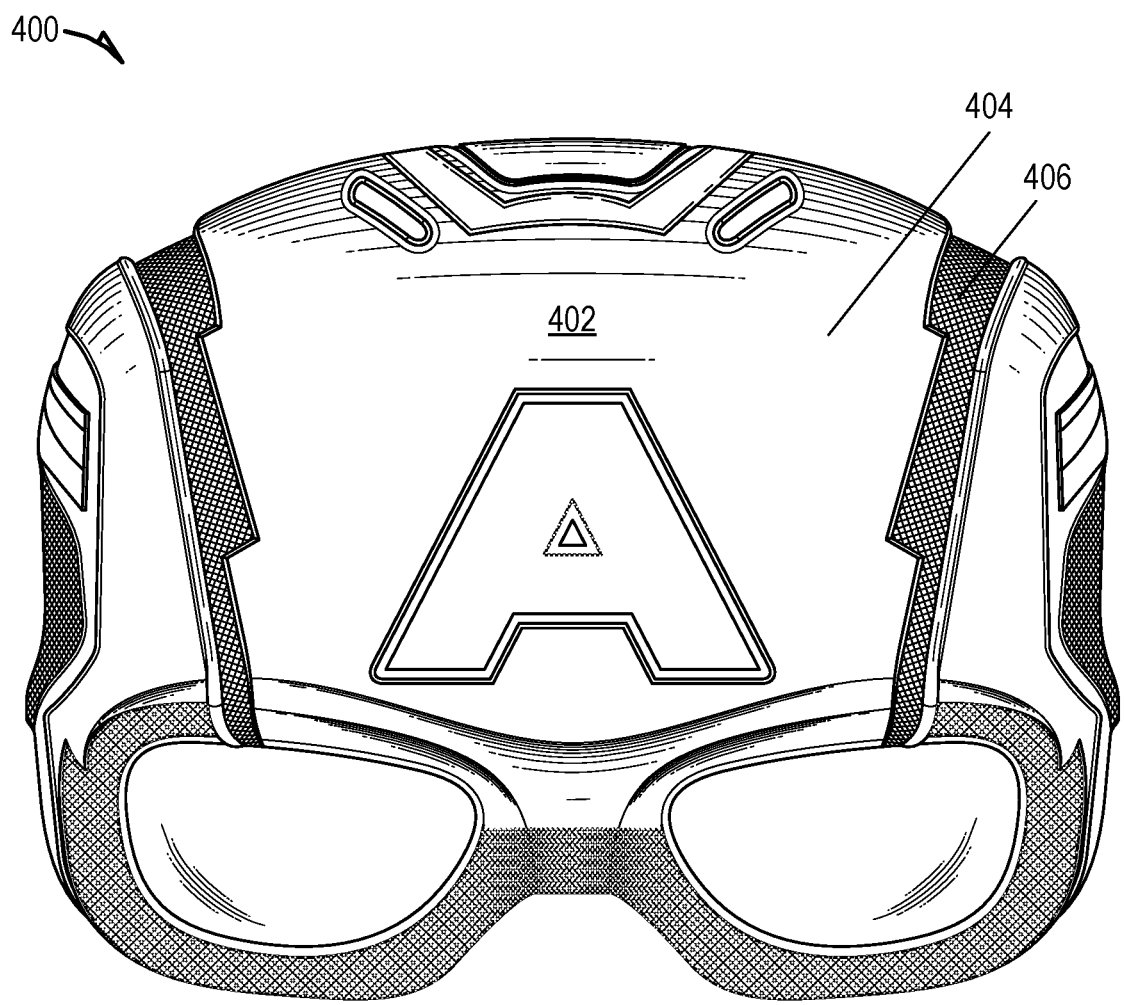
FIG. 4 shows an eyewear apparatus including multiple textures, according to some example embodiments.

FIG. 4 shows an eyewear apparatus 400 including multiple textures, according to some example embodiments. As shown, the eyewear apparatus 400 includes an additional structure 402 that depicts a character's mask. The additional structure 402 covers a user's forehead when the eyewear apparatus 400 is fitted around the user's face. As a result, the eyewear apparatus 400 creates the illusion that the user is wearing the character's mask and/or is the character depicted by the additional structure 402 when the eyewear apparatus 400 is fitted around the user's face.

As shown, the additional structure 402 includes portions with different textures. A texture indicates a feel, appearance and/or consistency of a surface. For example, textures can include bumpy, smooth, rough, hard, soft, shiny, matte, etc. As shown, the additional structure 402 includes a first portion 404 that has a first texture, and a second portion 406 that has a second texture that is different than the first texture. For example, the first texture can be smooth whereas the second texture can be bumpy or rough.

The various textures can be achieved by molding materials to have the various textures as well as by utilizing various materials. For example, differing materials such as plastic, leather, pleather, etc., can be used to achieve various textures. As another example, plastic can be molded to have various textures, such as smooth or rough. Although the eyewear apparatus 400 is described as having only two distinct textures, this is only one example and is not meant to be limiting. The eyewear apparatus 400 can include any number of textures, and this disclosure recognizes all such embodiments.

Figure 5:
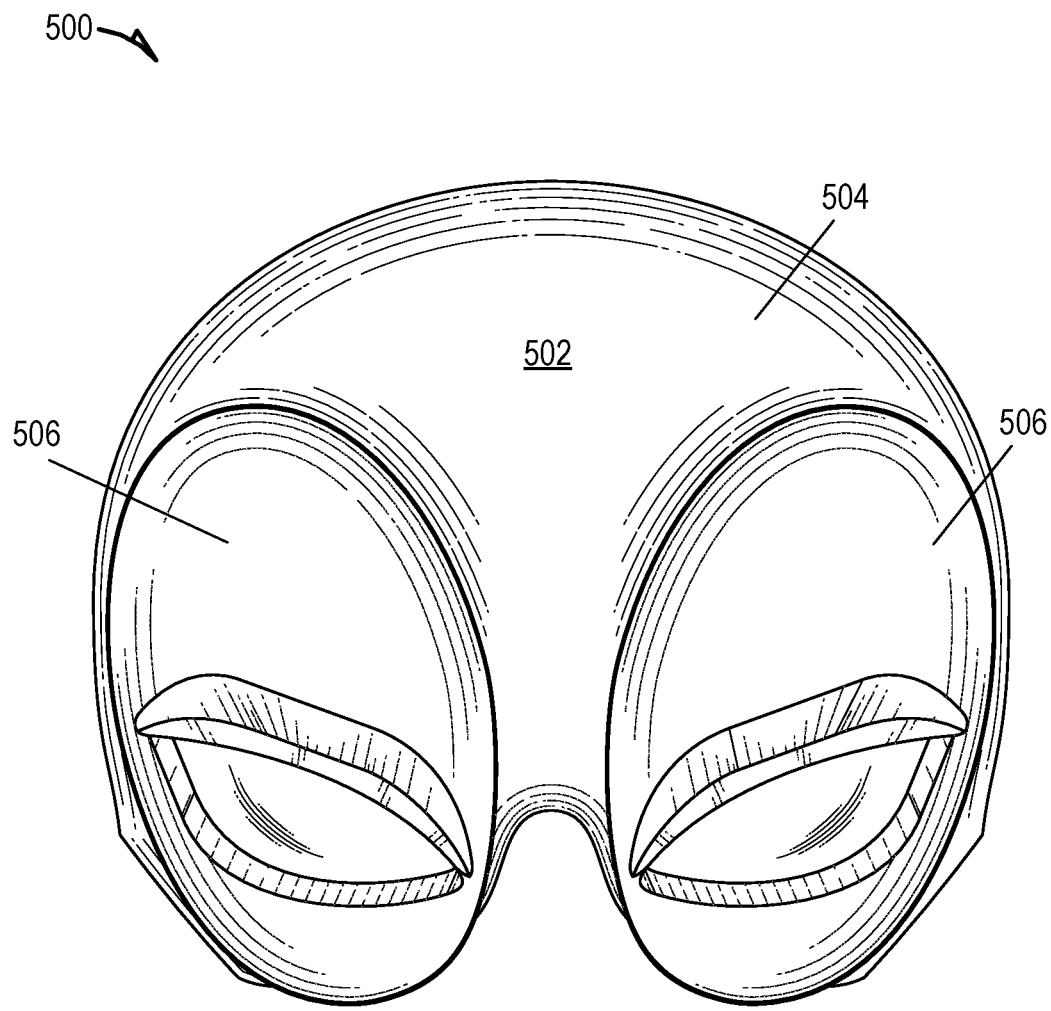
FIG. 5 shows an eyewear apparatus including a soft touch portion, according to some example embodiments.

FIG. 5 shows an eyewear apparatus 500 including a soft touch portion, according to some example embodiments. As shown, the eyewear apparatus 500 includes an additional structure 502 that depicts a character's mask. The additional structure 502 covers a user's forehead when the eyewear apparatus 500 is fitted around the user's face. As a result, the eyewear apparatus 500 creates the illusion that the user is wearing the character's mask and/or is the character depicted by the additional structure 502 when the eyewear apparatus 500 is fitted around the user's face.

As shown, the additional structure 502 includes a first portion 504 that makes up the forehead portion of the character's mask and a second portion 506 that surrounds the eye holes of the character's mask. The second portion 506 can be made to have a soft touch in relation to the first portion 505. For example, the second portion can be made of a material that is different than the material used to make the first portion 504 of the additional structure 502. Further, the material used to make the second portion 506 of the additional structure 502 can be softer than the material used to make the first portion 504 of the additional structure. For example the second portion 504 can be made of a relatively softer material, such as leather, padding, foam, etc., which can provide a soft feel and touch to the second portion 504 of the additional structure 502. Conversely, the first portion 504 of the additional structure 502 can be made using a relatively harder material, such as plastic, wood, metal, etc., to provide a harder feel and touch to the first portion 504 of the additional structure.

Figure 6:
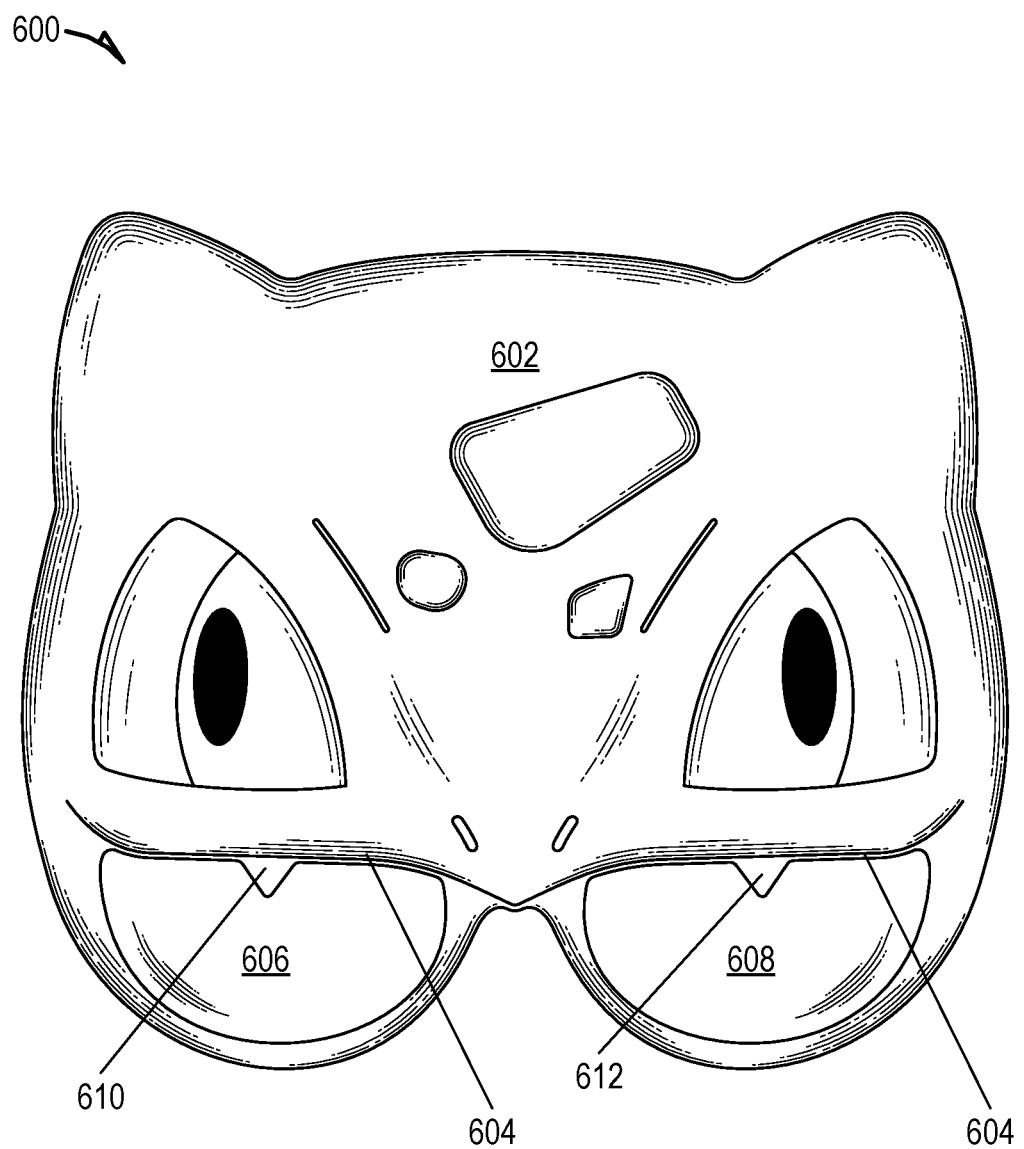
FIG. 6 shows an eyewear apparatus including an overlapping portion, according to some example embodiments.

FIG. 6 shows an eyewear apparatus 600 including an overlapping portion, according to some example embodiments. As shown, the eyewear apparatus 600 includes an additional structure 602 that depicts the face of a character. The additional structure 602 covers a user's forehead when the eyewear apparatus 600 is fitted around the user's face. The additional structure 602 depicts the character's eyes, nose and mouth. As a result, the character's face appears over the user's forehead when the eyewear apparatus 600 is fitted around the user's face.

The additional structure 602 includes an overlapping portion 604 that overlaps with both a first lens 606 and a second lens 608 of the eyewear apparatus 600. The overlapping portion 604 depicts the mouth of the character.

The additional structure 602 includes a first subcomponent 610 and a second subcomponent 612 that are coupled to the bottom edge of the overlapping portion 604 of the additional structure. The first subcomponent 610 and the second subcomponent 612 depict teeth of the character.

Figure 7:
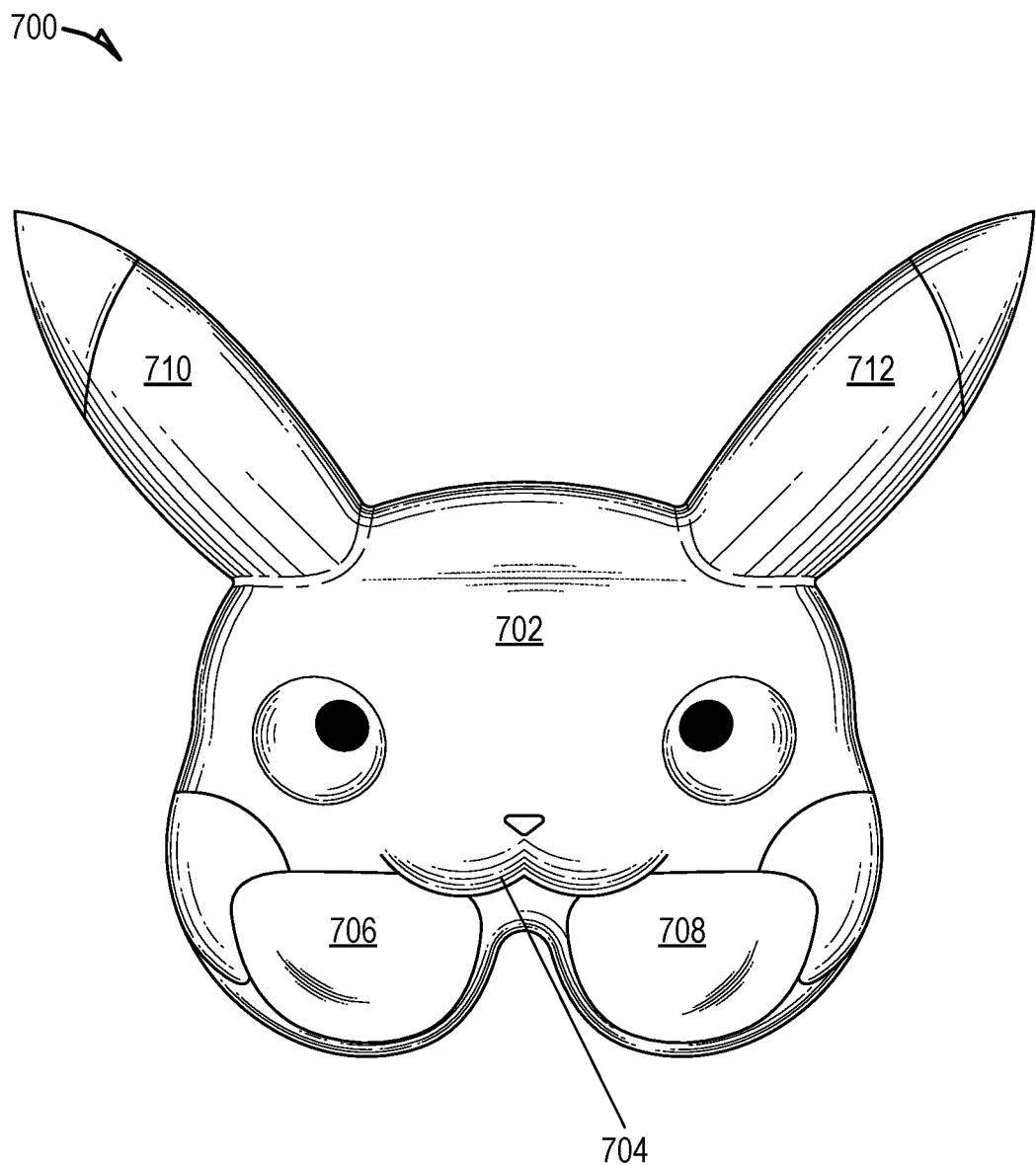
FIG. 7 shows an eyewear apparatus including an overlapping portion, according to some example embodiments.

FIG. 7 shows an eyewear apparatus 700 including an overlapping portion, according to some example embodiments. The eyewear apparatus 700 includes an additional structure 702 that depicts the face of a character. The additional structure 702 covers a user's forehead when the eyewear apparatus 700 is fitted around the user's face. The additional structure 702 depicts the character's eyes, nose and mouth. As a result, the character's face appears over the user's forehead when the eyewear apparatus 700 is fitted around the user's face.

The additional structure 702 includes an overlapping portion 704 that overlaps with both a first lens 706 and a second lens 708 of the eyewear apparatus 700. The overlapping portion 704 depicts the mouth of the character.

The additional structure 702 includes a first subcomponent 710 and a second subcomponent 712 that are coupled to outside edges of the additional structure 702. The first subcomponent 710 and the second subcomponent 712 depict the character's ears.

Figure 8:
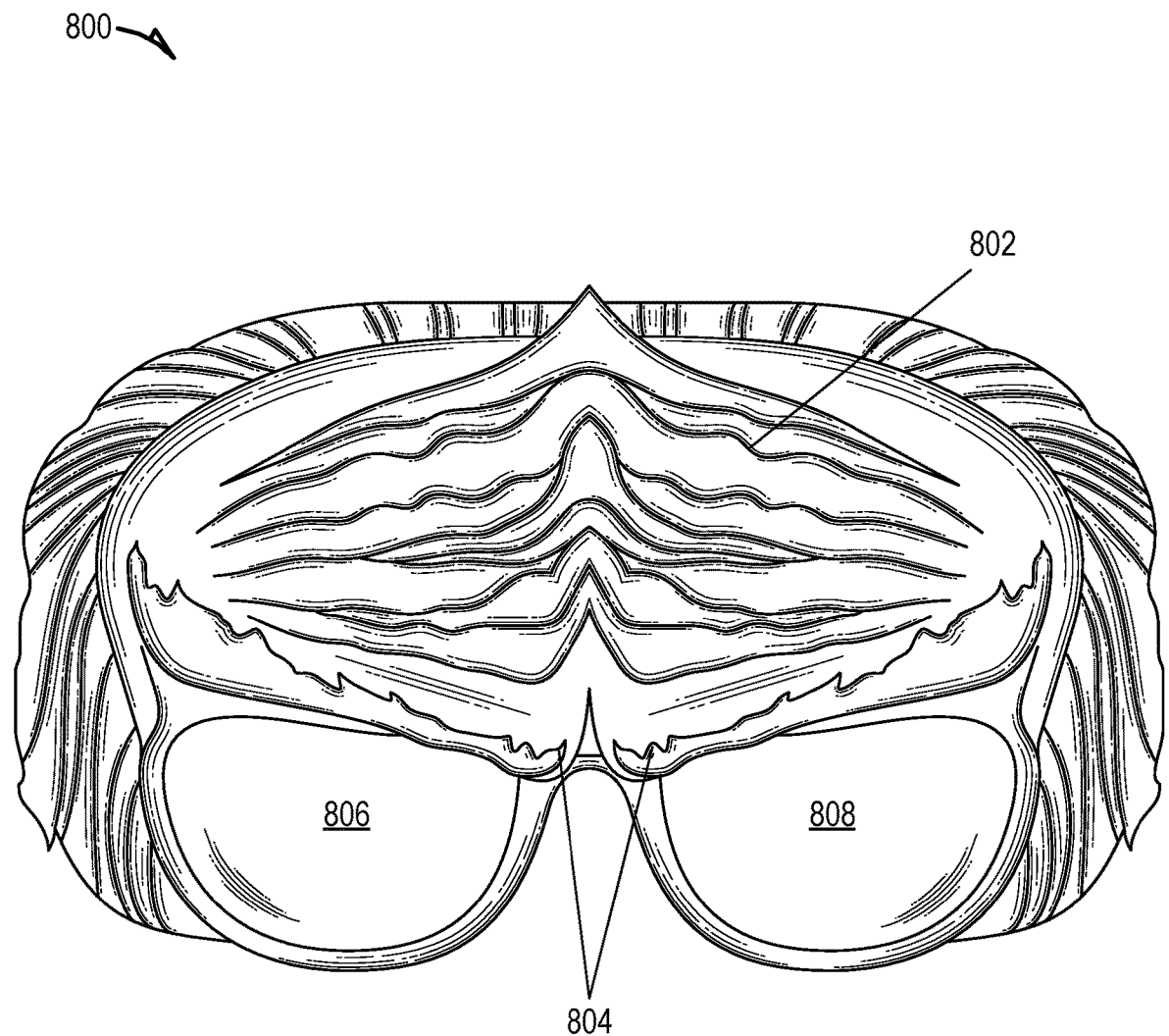
FIG. 8 shows an eyewear apparatus depicting a character, according to some example embodiments.

FIG. 8 shows an eyewear apparatus 800 depicting a character, according to some example embodiments. As shown, the eyewear apparatus 800 includes an additional structure 802 that depicts the forehead and hair of a character. The additional structure 802 covers a user's forehead when the eyewear apparatus 800 is fitted around the user's face. As a result, the eyewear apparatus 800 creates the illusion that the user is the character depicted on the additional structure 802 of the eyewear apparatus when the eyewear apparatus 800 is fitted around the user's face.

The additional structure 802 includes an overlapping portion 804 that overlaps a portion of a first lens 806 and a second lens 808 of the eyewear apparatus 800. The overlapping portion 804 depicts the character's eyebrows.

Figure 9:
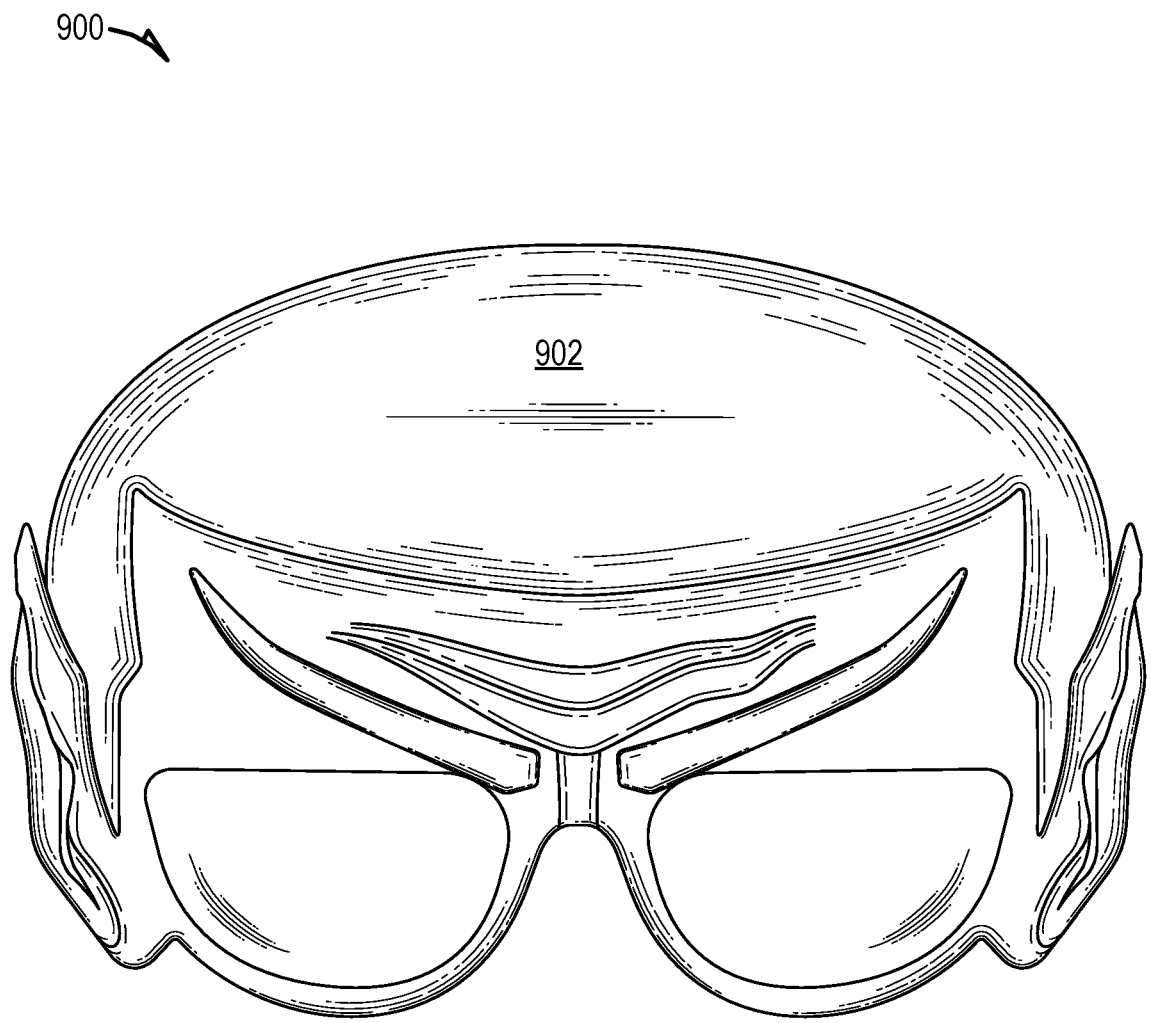
FIG. 9 shows an eyewear apparatus depicting a character, according to some example embodiments.

FIG. 9 shows an eyewear apparatus 900 depicting a character, according to some example embodiments. As shown, the eyewear apparatus 900 includes an additional structure 902 that depicts the forehead and hair of a character. The additional structure 902 covers a user's forehead when the eyewear apparatus 900 is fitted around the user's face. As a result, the eyewear apparatus 900 creates the illusion that the user is the character depicted on the additional structure 902 of the eyewear apparatus when the eyewear apparatus 900 is fitted around the user's face.

It is understood that these are examples of certain embodiments of the subject technology, and that other aesthetic designs, mechanical configurations, and various materials, can be used without departing from the technology. It is further understood that various colors and shapes of frames and lenses may be used. Various colors and shapes of frames and lenses may be used to complement the forehead frame, including for example: different colors (e.g., blue, black, red, green, purple, clear, transparent, etc.) and/or different shapes (e.g., circular, ovular, square, elliptical, etc.). Any other suitable color and/or shape may be used for implementing the disclosed eyewear apparatuses.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. An eyewear apparatus comprising:
    a frame comprising a first eyepiece and a second eyepiece connected by a bridge portion of the frame, wherein a first lens is disposed within an aperture of the first eyepiece;
    a first earpiece coupled to the first eyepiece and a second earpiece coupled to the second eyepiece, wherein the eyewear apparatus is configured to be fitted around a face of a user such that the first earpiece is supported by a first ear of the user, the second earpiece is supported by a second ear of the user, the bridge portion of the frame is supported by a nose of the user, and the first eyepiece is aligned with a first eye of the user to allow the user to see through the first lens disposed within the aperture of the first eyepiece;
    an additional structure coupled to the frame such that the additional structure covers a portion of a forehead of the user when the eyewear apparatus is fitted around the face of the user, the additional structure depicting a portion a character;
    a first three-dimensional piece affixed to a back side of the additional structure, the first three-dimensional piece protruding outward from behind the additional structure to provide additional depth to the character; and
    a second three-dimensional piece affixed to a front side of the additional structure, the second three-dimensional piece protruding outward from the front side of the additional structure.

2. The eyewear apparatus of claim 1, wherein a third three-dimensional piece is affixed to an outside edge of the additional structure and extends outward beyond the outside edge of the additional structure, the three-dimensional piece depicting a wing of the character.

3. The eyewear apparatus of claim 2, wherein a third three-dimensional piece is affixed to a front side of the additional structure.

4. The eyewear apparatus of claim 2, wherein a third three-dimensional piece is affixed to a back side of the additional structure.

5. The eyewear apparatus of claim 2, wherein the additional structure depicts a helmet worn by the character that includes the wing.

6. The eyewear apparatus of claim 1, wherein the second three-dimensional piece depicts a horn of the character.

7. The eyewear apparatus of claim 1, wherein the second three-dimensional piece is affixed to tie front side of the additional structure above the first eyepiece and depicts an eyelash of the character.

8. The eyewear apparatus of claim 1, wherein the additional structure includes at least a first portion and a second portion, the first portion having a first texture and the second portion having a second texture that is different than the first texture.

9. The eyewear apparatus of claim 8, wherein the first texture is bumpy and the second texture is smooth.

10. The eyewear apparatus of claim 8, wherein the first portion is made from a first material and the second portion is made from a second material, the first material being softer than the second material.

11. The eyewear apparatus of claim 1, wherein the additional structure depicts a helmet of the character, the eyewear apparatus creating the illusion that the user is wearing the helmet when the eyewear apparatus is fitted around the face of the user.

12. The eyewear apparatus of claim 1, wherein the additional structure depicts a forehead of the character, the eyewear apparatus creating the illusion that the user is the character when the eyewear apparatus is fitted around the face of the user.

13. The eyewear apparatus of claim 1, wherein a portion of the additional structure overlaps with a portion of the first eyepiece such that the additional structure obscures a second users view of the first lens when the eyewear apparatus is fitted around the face of the user.

14. The eyewear apparatus of claim 13, wherein the portion of the additional structure that overlaps with the portion of the first eyepiece depicts the mouth of the character, wherein a second portion of the additional structure that is positioned above the portion of the additional structure that overlaps with the portion of the first eyepiece depicts eyes of the character.

15. The eyewear apparatus of claim 14, wherein the portion of the additional structure that overlaps with the portion of the first eyepiece is rounded downwards towards the bridge portion of the frame.

16. The eyewear apparatus of claim 15, further comprising:
 a sub-component coupled to a bottom edge of the portion of the additional structure that overlaps with the portion of the first eyepiece, the sub-component depicting a tooth of the character.

17. The eyewear apparatus of claim 1, wherein the additional structure is a separate piece from the frame.

18. The eyewear apparatus of claim 17, wherein the additional structure is coupled to the frame by one or more screws.

19. The eyewear apparatus of claim 17, wherein the additional structure is coupled to the frame by an adhesive material.

20. The eyewear apparatus of claim 1, wherein the additional structure and the frame are formed as a single piece.

* * * * *